Aug. 23, 1949.  W. L. TEEMSMA  2,479,985
ADJUSTABLE AND INTERCHANGEABLE LAWN MOWER TIRE
Filed Oct. 13, 1947
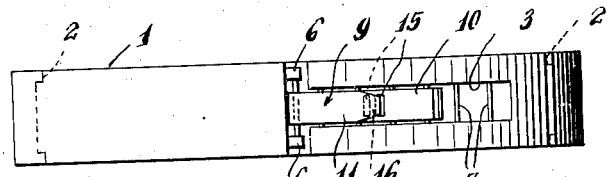
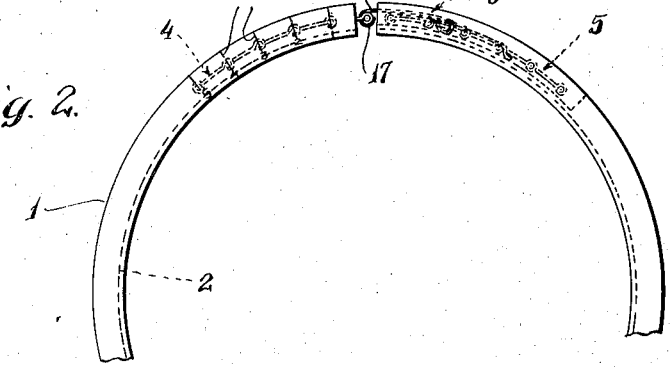
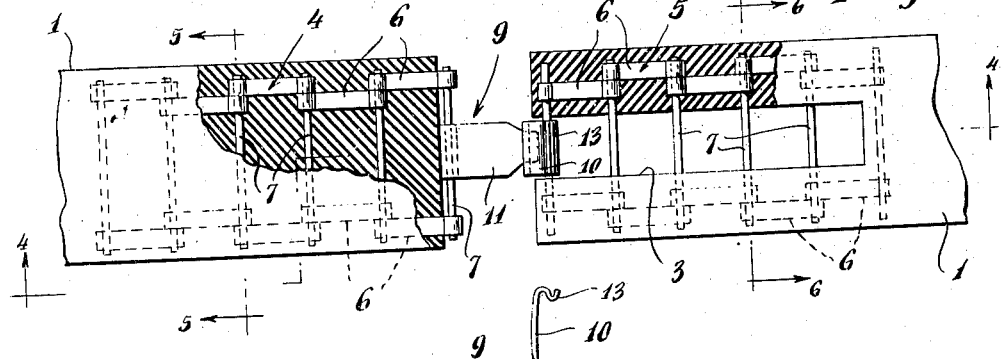
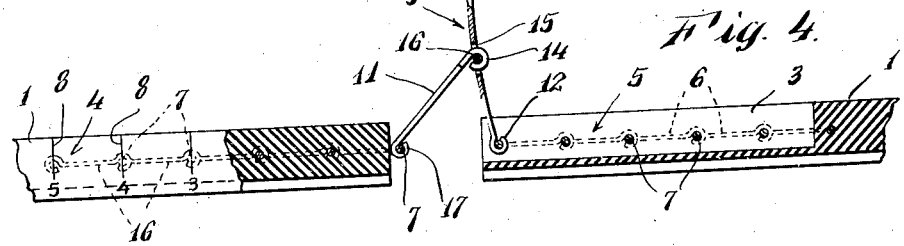
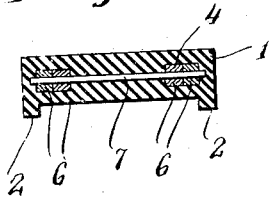 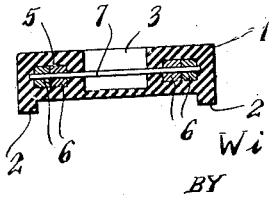
INVENTOR.
William L. Teemsma
BY
ATTORNEY.

UNITED STATES PATENT OFFICE 2,479,985

ADJUSTABLE AND INTERCHANGEABLE LAWN MOWER TIRE

William L. Teemsma, Rutherford, N. J.

Application October 13, 1947, Serial No. 779,542

4 Claims. (Cl. 152—375)

This invention relates to a rubber tire for lawn mowers and it is one object of the invention to provide a tire of such construction that it may be mounted about a wheel of a lawn mower and thus provide better traction for the lawn mower and also eliminate objectionable noises which occur when a lawn mower having bare metal wheels is in use.

Another object of the invention is to provide a tire of such construction that it may easily be applied to a lawn mower wheel and securely held in place about the wheel.

Another object of the invention is to provide a rubber tire having divided ends, chains being embedded in the end portions of the tire and one chain carrying a fastener for engaging the other chain and contracting the tire about the wheel so that the tire fits tightly about the wheel.

Another object of the invention is to provide a tire having chains in its end portion of such construction that one end portion of the tire may be cut off and thus cause the tire to be of such length that it will fit snugly about the wheel to which it is applied.

Another object of the invention is to provide a tire having a lever or handle pivoted to the outer end of one chain and carrying a member adapted for detachable engagement with the chain in the other end portion of the tire, a groove being provided to receive the lever when the lever is swung to a securing position and thus dispose the lever in countersunk relation to the outer surface of the tire.

Another object of the invention is to provide a tire which is of simple construction, capable of being easily applied to or removed from a lawn mower wheel, and cheap to manufacture.

The invention is illustrated in the accompanying drawings wherein:

Fig. 1 is a view looking down upon the improved tire.

Fig. 2 is a view showing a portion of the tire in side elevation.

Fig. 3 is a view upon an enlarged scale showing a portion of the tire partially in top plan and partially in longitudinal section.

Fig. 4 is a view taken along the line 4—4 of Figure 3.

Fig. 5 is a sectional view taken through one end of the tire along the line 5—5 of Figure 3.

Fig. 6 is a view similar to Figure 5 taken through the other end portion of the tire along the line 6—6 of Figure 3.

The improved tire constituting the subject matter of this invention is indicated in general by the numeral 1 and consists of a strip of rubber, or other suitable material, of such width that it will extend the full width of the rim or peripheral edge face of a lawn mower wheel with its marginal flanges 2 engaging side faces of the wheel and preventing the tire from slipping transversely off of the wheel. The rubber strip forming the tire is of such length that it will be applicable to wheels of several diameters, it being understood that when the tire is to be applied to a wheel it will be cut to such length that when it is applied about the wheel its ends will be spaced slightly from each other. One end portion of the tire is formed with a groove or recess 3 extending longitudinally of the tire and located midway the width thereof, and in end portions of the tire are embedded chains 4 and 5.

The chains 4 and 5 are of duplicate construction and each has at its sides links 6 through which pass end portions of cross pins 7 so that the links 6 will be pivotally connected with each other and the tire thus allowed to be fitted smoothly about the periphery of a wheel for its entire circumference. The links at the outer end of the chain 4 project from the tire and the cross pin carried thereby is spaced slightly from the tire but the links of the chain 5 are all entirely embedded in the tire with their cross pins passing transversely through the groove 3. As previously stated, the tire is initially of such length that it will be long enough to encircle wheels of more than one diameter, and in order that the tire may be accurately cut to predetermined lengths there has been provided scale markings 8 upon one or both side edge faces of the end portion of the tire in which the chain 4 is embedded. By observing these scale marks a person may cut the tire at a selected mark and the tire will be reduced to such a length that it will fit about a wheel of known diameter and have its ends spaced slightly from each other, as shown in Figure 1, when tightened about the wheel.

In order to secure the tire about the wheel there has been provided a fastener 9 consisting of a lever 10 and an arm 11. The lever has its inner end bent to form an eye 12 through which passes the cross pin at the outer end of the chain 5 and the outer, or free end, of the lever is bent to form a hook 13. The lever is formed of resilient metal and is curved longitudinally, as shown in Figure 4, so that when the lever is swung downwardly to the secured position it will conform to the curvature of the tire and fit snugly in the groove 3. This curvature of the lever also allows the hook 13 of the lever to be snapped into gripping engagement with a cross pin of the chain 5 and securely hold the lever in its secured position. The arm 11 is formed from a metal strip and has its inner end bent to form a hook 14 which passes through openings 15 formed in the lever and about a cross portion 16 of the lever between these openings and pivotally connects the arm with the lever. The outer end of the arm is also bent to form a hook 17 which is sufficiently open to allow it to be detachably engaged with the outer cross pin of the chain 4. When the lever is swung downwardly from the raised position shown in Figure 4 to a securing position in which it is seated within the groove 3 pull is exerted by the arm 11 to draw the ends of the tire towards each other and the tire will be contracted about the rim of the wheel into close fitting engagement therewith where it will be firmly held by action of the fastener 9 and the flanges 2 of the tire. When it is necessary to replace the tires of a lawn mower or it is desired to transfer them to another lawn mower it is merely necessary to swing the levers of their fasteners upwardly to the extended or releasing position and the hooks 17 of the arms 11 may be easily disconnected from the outer cross pins of the chains 4 and the tires stripped from the wheels.

From the foregoing description of the construction of my improved lawn mower, the method of assembly and the operation thereof will be readily understood, and it will be seen that I have provided a comparatively simple, inexpensive and efficient means for carrying out the various objects of the invention.

While I have particularly described the elements best adapted to perform the functions set forth, it is apparent that various changes in form, preparation and in the manner details of construction may be resorted to, without departing from or sacrificing any of the principles of the invention.

Having thus described the invention, what is claimed is:

1. A tire for a lawn mower comprising a strip of elastic material of a length adapting it to extend about the peripheral edge face of a wheel, one end portion of said strip being formed in its outer face with a groove extending longitudinally of the strip, chains embedded in end portions of the strip and each having overlapping side links extending longitudinally in the tire adjacent side edges thereof and cross pins extending between the links and having end portions passing through overlapping portions of the links and pivotally connecting the links with each other, the cross pins of one chain passing transversely through the groove and spaced from each other longitudinally thereof, the other chain having ends of its outer links projecting from the end of the strip and its outer cross pin spaced from the said end of the strip, and a fastener for removably securing the strip about a wheel consisting of a resilient lever having an inner end fitting into the groove and formed with an eye through the outer cross pin of the first chain passes to pivotally mount the lever, said lever having a hook at its free end adapted to be snapped into gripping engagement with another cross pin in the groove when the lever is swung into the groove to a securing position, and an arm having an inner end pivoted to said lever and an outer end formed with a hook detachably engaged about the outer cross pin of the second chain and exerting pull to draw ends of the strip towards each other when the lever is swung downwardly into the groove with the arm to its securing position.

2. A tire formed of pliable material and of a length adapting it to extend about the peripheral edge face of a wheel, one end portion of said tire being formed with a groove extending longitudinally in its outer face, chains embedded in end portions of said tire and having cross bars extending transversely of the tire, certain of the cross bars of one chain passing through the groove transversely thereof and a cross bar at the outer end of the other chain being spaced outwardly from the other end of the tire, a lever pivoted to the cross bar at the outer end of the first chain for tilting movement from an extended position to a securing position in which it extends longitudinally in the groove, towards the inner end of the groove the free end of said lever being formed with a hook adapted to be removably snapped into gripping engagement with a cross bar spaced from the end of the chain carrying the lever and releasably hold the lever in spaced relation to the pivoted end thereof in its securing position, and an arm pivoted to said lever and having a hook at its free end for removably and pivotally engaging the outwardly disposed cross bar of the second chain and exerting pull to draw ends of the tire towards each other and tighten the tire about a wheel when the lever is swung to its securing position.

3. A tire for a lawn mower wheel comprising an elongated strip of pliable material for fitting about the periphery of a wheel, chains embedded in end portions of said strip and having side links extending longitudinally of the strips and cross bars, one chain having portions of its cross bars exposed intermediate the width of the outer face of the strip and the other chain having end portions of its links at one end projecting from the strip and the cross bar carried by the projecting ends of the last mentioned links spaced from the adjoining end of the strip, a lever pivoted to the cross bar at the outer end of the first chain and having a hook adapted to be snapped into gripping engagement with another cross bar of the said chain when the lever is swung from an extended position to a securing position in which it extends longitudinally of the strip, and an arm pivoted to said lever in spaced relation to the pivoted end thereof and provided with a hook for detachably engaging the exposed outer cross bar of the second chain and exerting pull to tighten the tire about the wheel when the lever is swung to its securing position.

4. A tire for a lawn mower wheel comprising a strip of a length adapting it to extend about the periphery of a wheel, chains embedded in end portions of said strip and each having side links and cross bars pivotally connecting the links, the cross bars of one chain being exposed for a portion of the width of the strip and the other chain having a cross bar at its outer end spaced outwardly from the adjoining end of the strip, an edge face of said strip having scale markings thereon in cooperating relation to the cross bars of the second chain whereby the strip may be accurately severed to provide a strip of a length adapting it to fit about a wheel of predetermined diameter and have its ends spaced from each other, a lever pivoted to one cross bar of the first chain and adapted for gripping engagement with a second cross bar thereof to releasably hold the lever in a securing position longitudinally of the strip, and an arm carried by said lever for removably engaging the exposed cross bar of the second chain and exerting pull to hold the strip tightly about the wheel when the lever is swung into an operative position.

WILLIAM L. TEEMSMA.

REFERENCES CITED

The following references are of record in the file of this patent:

UNITED STATES PATENTS

| Number | Name | Date |
|---|---|---|
| 1,203,915 | Schmitt | Nov. 7, 1916 |
| 1,248,326 | Hocker | Nov. 27, 1917 |
| 1,585,590 | Lisson | May 18, 1926 |